United States Patent
Angell et al.

(10) Patent No.: US 7,839,264 B2
(45) Date of Patent: Nov. 23, 2010

(54) DETECTION OF UNPLANNED WASTE STREAM DIVERSION USING RFIDS

(75) Inventors: Robert L. Angell, Salt Lake City, UT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 12/043,248

(22) Filed: Mar. 6, 2008

(65) Prior Publication Data

US 2009/0224915 A1    Sep. 10, 2009

(51) Int. Cl.
*H04Q 5/22* (2006.01)
(52) U.S. Cl. .................... 340/10.5; 340/10.1; 340/572.1
(58) Field of Classification Search ................. 340/572, 340/10, 505
See application file for complete search history.

(56) References Cited

U.S. PATENT DOCUMENTS

| | | | | |
|---|---|---|---|---|
| 7,068,170 B2* | 6/2006 | Green | | 340/572.1 |
| 7,504,949 B1* | 3/2009 | Rouaix et al. | | 340/572.1 |
| 2005/0212675 A1* | 9/2005 | Green | | 340/572.8 |
| 2009/0224916 A1* | 9/2009 | Angell et al. | | 340/572.1 |

* cited by examiner

*Primary Examiner*—Travis R Hunnings
(74) *Attorney, Agent, or Firm*—Dillon & Yudell, LLP

(57) ABSTRACT

Unplanned waste stream diversions are detected through the use of Radio Frequency Identification (RFID) tags. Input bulk material coming into the facility is laced with multiple RFID tags, which are suspended in a colloidal state in the input bulk material. Incoming RFID tags are counted, and then re-counted as they leave the facility, either as part of a known waste material stream or as part of a finished product. If the incoming and outgoing counts differ, then a conclusion is reached that some of the incoming RFID tags are within an unplanned waste stream diversion.

20 Claims, 4 Drawing Sheets

DETECTION OF UNPLANNED WASTE STREAM DIVERSION USING RFIDS

BACKGROUND OF THE INVENTION

1. Technical Field

The present disclosure relates to the field of processing and manufacturing operations, and specifically to waste products created by such operations. Still more particularly, the present disclosure relates to electronically detecting any unplanned diversion of waste products emanating from a processing/manufacturing facility.

2. Description of the Related Art

Chemical processing plants, refineries, manufacturing plants and similar facilities often use feed stock (used in chemical processing plants and refineries), raw material (used in manufacturing plants), and/or substrates (used in chemical processing plants as well as in the manufacture of electronics such as ICs) in their operation. Such materials may be toxic, and include organic and inorganic chemicals, solvents, reagents, etc.; metals/metalloids such as arsenic and gallium; heavy metals such as lead; etc.

Similarly, plants and/or refineries can also create their own toxins as a product or a by-product of a process. For example, one or more reactants may initially be non-toxic but, after undergoing a chemical reaction, may create toxic products and/or toxic waste by-products.

Furthermore, plants and/or refineries may utilize material that is toxic (either initially or after being utilized), but that is not part of a product stream. For example, a plant may maintain processing equipment with a lubricant that is a carcinogen (causes cancer), a toxin (causes death or organ damage) and/or a teratogen (causes birth defects.)

Monitoring employee exposure to such hazardous materials is somewhat manageable, since a plant or similar facility is generally within a contained environment, if not totally indoors. However, monitoring plant neighbors' exposure to such hazardous materials is more problematic, since there are often multiple routes by which such toxins may exit the plant.

SUMMARY OF THE INVENTION

Unplanned waste stream diversions are detected through the use of Radio Frequency Identification (RFID) tags. Input bulk material coming into the facility is laced with multiple RFID tags, which are suspended in a colloidal state in the input bulk material. Incoming RFID tags are counted, and then re-counted as they leave the facility, either as part of a known waste material stream or as part of a finished product. If the incoming and outgoing counts differ, then a conclusion is reached that some of the incoming RFID tags are within an unplanned waste stream diversion.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
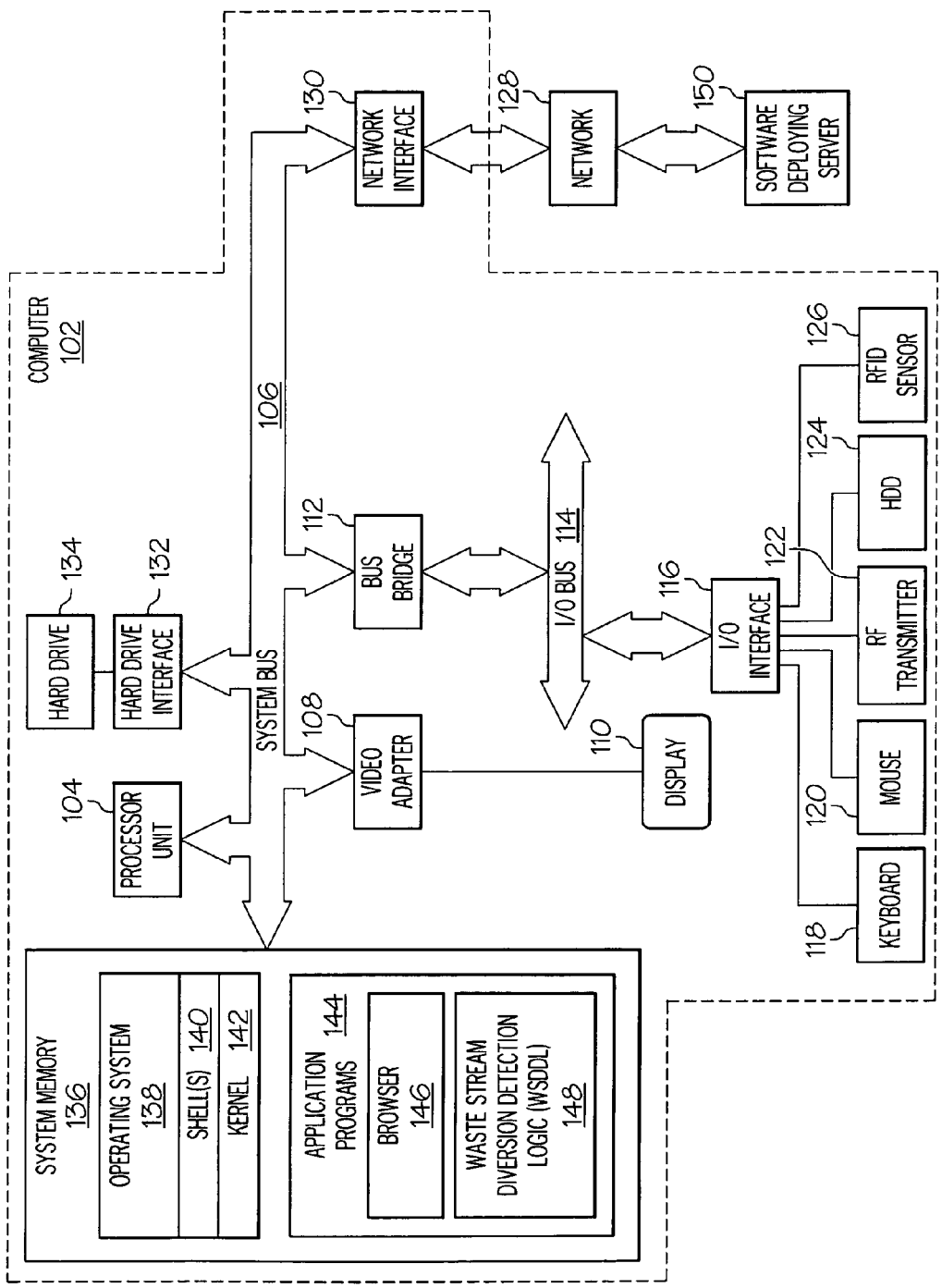
FIG. 1 depicts an exemplary computer in which the present invention may be utilized.

With reference now to the figures, and in particular to FIG. 1, there is depicted a block diagram of an exemplary computer 102, which the present invention may utilize. Note that some or all of the exemplary architecture shown for computer 102 may be utilized by software deploying server 150.

Computer 102 includes a processor unit 104, which may utilize one or more processors each having one or more processor cores, that is coupled to a system bus 106. A video adapter 108, which drives/supports a display 110, is also coupled to system bus 106. System bus 106 is cope via a bus bridge 112 to an Input/Output (I/O) bus 114. An I/O interface 116 is coupled to I/O bus 114. I/O interface 116 affords communication with various I/O devices, including a keyboard 118, a mouse 120, a Radio Frequency (RF) transmitter 122, a Hard Disk Drive (HDD) 124, and a Radio Frequency Identification (RFID) sensor 126. It is recognized that RF transmitter 122 and RFID sensor 126 should be protected from one another, by distance or a shield (not shown), in order to enable proper functionality of the RFID sensor 126. The format of the ports connected to I/O interface 116 may be any known to those skilled in the art of computer architecture, including but not limited to Universal Serial Bus (USB) ports.

Computer 102 is able to communicate with a software deploying server 150 via a network 128 using a network interface 130, which is coupled to system bus 106. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a World Wide Web (WWW) client (i.e., computer 102) to send and receive network messages to the Internet using HyperText Transfer Protocol (HTTP) messaging, thus enabling communication with software deploying server 150 and other described computer systems.

Application programs 144 in computer 102's system memory (as well as software deploying server 150's system memory) also include a Waste Stream Diversion Detection Logic (WSDDL) 148. WSDDL 148 includes code for implementing the processes described below, and particularly as described in FIGS. 2, 4 and 6. In one embodiment, computer 102 is able to download WSDDL 148 from software deploying server 150, including in an on-demand basis. Note further that, in one embodiment of the present invention, software deploying server 150 performs all of the functions associated with the present invention (including execution of WSDDL 148), thus freeing computer 102 from having to use its own internal computing resources to execute WSDDL 148.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
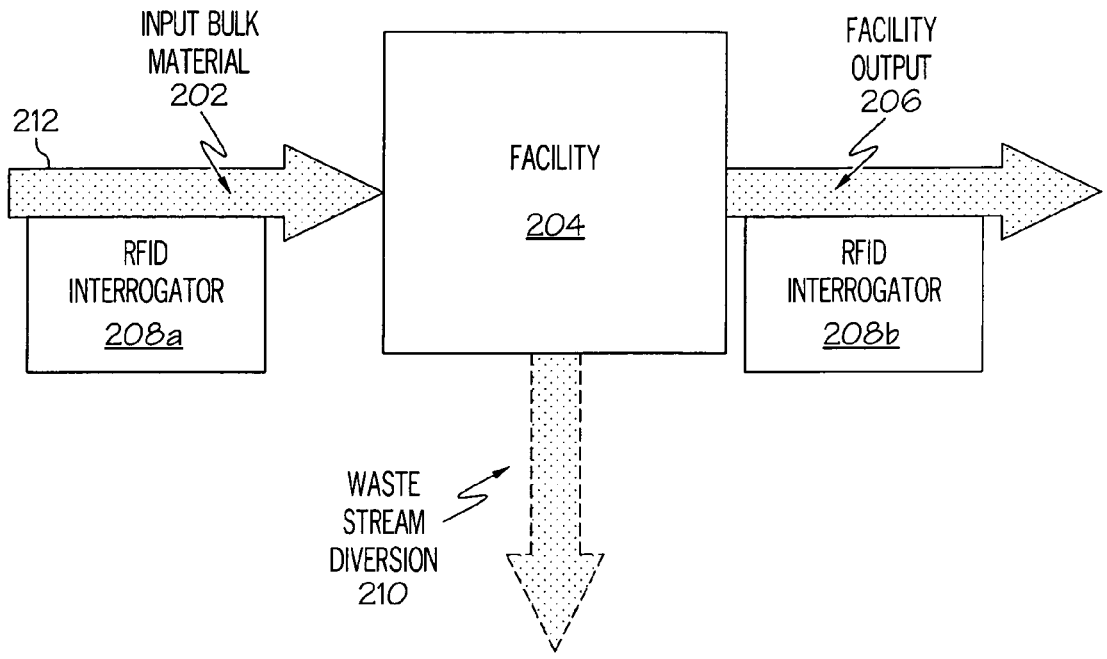
FIG. 2 illustrates a high-level overview of Radio Frequency Identification (RFID) tags, which are integrated into incoming (input) bulk material that enters a processing or manufacturing facility.

Referring now to FIG. 2, an exemplary high-level overview of the present invention is presented. Consider input bulk material 202 that is entering a facility 204, which outputs a facility output 206. The facility 204 may be any facility that utilizes free-flowing bulk material, as a liquid, a slurry, a colloid, a particulate solid (e.g., a powder, sand, etc.), etc. Examples of facility 204 include, but are not limited to, manufacturing plants, chemical plants, petroleum refineries, power plants, etc. Examples of input bulk material 202 and facility output 206 are likewise numerous. For example, if facility 204 is a chemical plant, input bulk material 202 could be raw chemical feed stock, while facility output 206 could be refined chemicals and/or expected known waste by-products, which may or may not be hazardous (toxic, flammable, etc.). If facility 204 is a plastics manufacturing plant, then input bulk material 202 could be raw plastic pellets, while facility output 206 could be molded plastic products. If facility 204 is a nuclear power plant, then the input bulk material 202 could be cooling water for a nuclear reactor, while facility output 206 could be heated water that has passed through the nuclear reactor. If facility 204 is a machine shop, the input bulk material 202 could be lubrication oil for rotating equipment (e.g., lathes), while the facility output 206 could be used lubrication oil that is recovered from the lathes. These examples are for illustrative purposes only, and are not to be construed as exhaustive descriptions of input bulk materials 202, facilities 204, and/or facility outputs 206. All scenarios described utilize the current concept of tracking unbound Radio Frequency Identification (RFID) tags as they move through and out of a facility.

Figure 3:
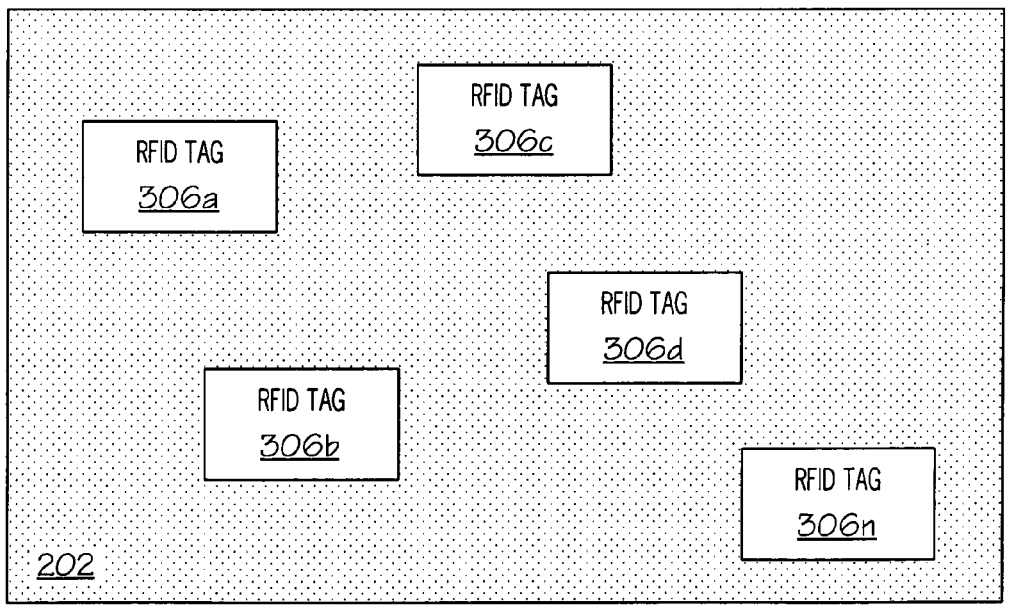
FIG. 3 depicts additional detail of the colloidal state nature of the unadhered RFID tags that lace the incoming bulk material.

As shown in FIG. 3, the input bulk material 202 is laced with multiple RFID tags 306*a-n*, where "n" is an integer. That is, the multiple RFID tags 306*a-n* are not adhered to the input bulk material 202, but rather are suspended within the input bulk material 202 in a colloidal state. Note that the RFID tags 306*a-n* are not shown to scale. That is, the RFID tags 306*a-n* are preferably small (i.e., less than 0.5 mm×0.5 mm), in order to allow them to flow freely and without clogging piping. In one embodiment, the RFID tags 306*a-n* remain uniformly mixed throughout the input bulk material 202. If the input bulk material 202 is a dry particulate matter (e.g., powder, sand, pellets, etc.), then the RFID tags 306*a-n* will naturally remain in a dispersed orientation. If the input bulk material 202 is a liquid, however, then a coating may need to be applied around the RFID tags 306*a-n*, in order to give them a same specific gravity as the input bulk material 202. This coating should have properties that do not act as a Faraday shield (which would prevent electronic interrogation of the RFID tags 306*a-n*) around the RFID tags 306*a-n*.

Examples of RFID tags 306*a-n* include any type of RFID tag known to those skilled in the art of electronic identification tags for storing and communicating Electronic Product Code (EPC) information. The RFID tags 306*a-n* may be active (i.e., battery powered), semi-passive (i.e., powered by a battery and a capacitor that is charged by an RF interrogation signal), or purely passive (i.e., either have a capacitor that is charged by an RF interrogation signal or are geometrically shaped to reflect back specific portions of the RF interrogation signal). However, due their smaller size which allows for a free-flowing input bulk material 202 to maintain a uniform distribution of the RFID tags 306*a-n*, and to avoid clogging up piping, RFID tags 306*a-n* are preferably passive RFID tags. These passive RFID tags may contain an on-board Integrated Circuit (IC) chip, or they may be chipless.

An RFID tag with an on-board IC chip is made up of two components: the IC chip and a coupled antenna. The IC chip stores and processes information, including EPC information that describes (name, chemical composition, manufacturer, lot number, etc.) the input bulk material 202. The IC chip may contain a low-power source (e.g., a capacitor that is charged by an interrogation signal received by the coupled antenna). Upon the capacitor being charged, the IC chip then generates a radio signal, which includes the EPC information, to be broadcast by the coupled antenna.

A chipless RFID tag, as the name implies, does not have an IC chip, but only an antenna that is shaped to reflect back a portion of an interrogation signal. That is, the chipless RFID tag (also known as a Radio Frequency (RF) fiber) is physically shaped to reflect back select portions of a radio interrogation signal from an RF transmission source. Chipless RFID tags typically have much shorter ranges than those that include an on-board IC chip. Furthermore, the amount of information that a chipless RFID tag can return is much smaller than that of an RFID tag that has an on-board IC chip.

Returning to FIG. 2, as the input bulk material 202 (laced with the RFID tags 306*a-n*) enters the facility 204, the RFID tags 306*a-n* are counted by an RFID interrogator 208*a*. RFID interrogator 208*a* utilizes an architecture substantially described in FIG. 1 for computer 102. That is, RFID interrogator 208*a* includes at least one RFID sensor 126, which interrogates and counts the passing RFID tags 306a-n as they enter the facility 204. This interrogation/counting is accomplished by transmitting an RF interrogation signal from an RF transmitter 122 (shown in FIG. 1) to the RFID tags 306a-n, which then respond with ID data for the input bulk material 202 in a manner described above. A total input count is then stored by and/or within the RFID interrogator 208a. Eventually, the input bulk material 202, either in an original form or in a transformed state, leaves the facility 204 as the known and expected facility output 206 (described above). An RFID interrogator 208b, which is architecturally the same as RFID interrogator 208a, if not the same device, counts exiting RFID tags 306a-n (which entered the facility 204 with the input bulk material 202). If the output count of RFID tags 306a-n leaving the facility 204 is less than the input count of RFID tags 306a-n that entered the facility, then a conclusion is reached that there has been some type of waste stream diversion 210. This waste stream diversion 210 may be a waste by-product of operations performed by the facility 204 on the input bulk material 202, or waste stream diversion 210 may simply be a diversion of the input bulk material 202 itself, either through unexpected leaks, pilferage, unwanted diversion to other processes within the facility 204, etc. That is, while the present process describes a tracking of a diversion of a waste stream, the process is also useful in tracking other movements of the input bulk material. All such tracking, however, is founded on an accurate tracking of the RFID tags 306a-n as they enter the facility 204.

Figure 4:
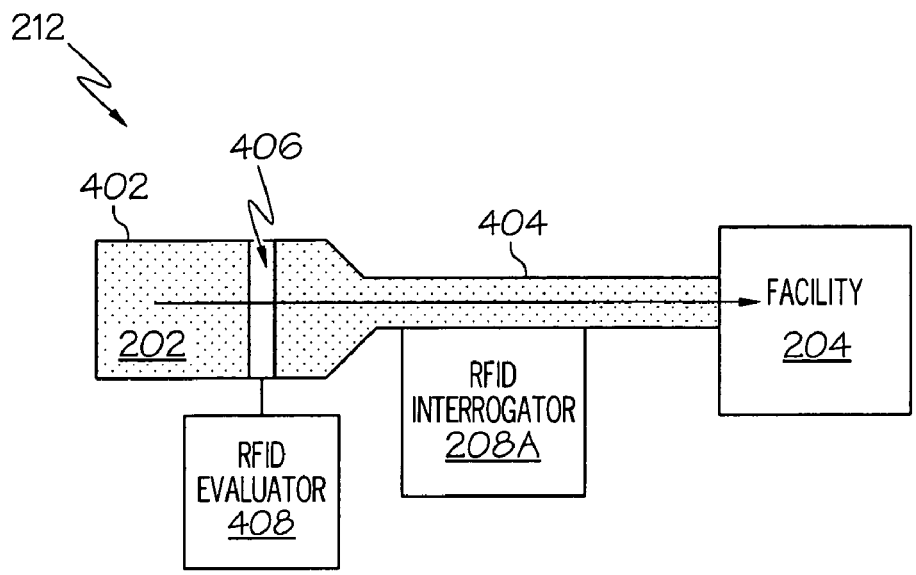
FIG. 4 illustrates an exemplary internal device and an exemplary external device that can be used to detect RFID tags as they enter and leave the facility via known pathways.
Figure 5:
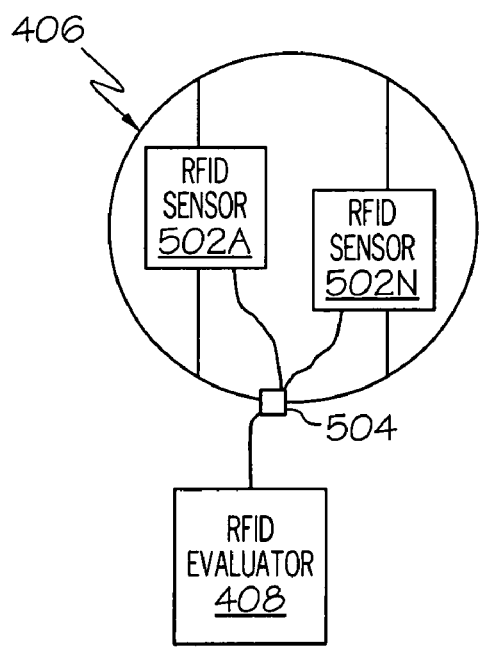
FIG. 5 depicts additional detail of the exemplary internal device, which comprises RFID sensor(s) mounted on a grid within a known pipeline.

With reference still to FIG. 2, consider a scenario in which an inlet pipe 212 is so large that RFID tags 306a-n in the middle of the inlet pipe 212 are unable to be "heard" by the RFID interrogator 208a. For example, assume that, after including any RF shielding properties of inlet pipe 212 and/or the input bulk material 202 itself, some of the RFID tags 306a-n cannot be detected by the RFID interrogator 208a, due to the distance from the RFID interrogator 208a to the central axis of the inlet pipe 212. FIGS. 4-5 present two exemplary solutions that permit all of the RFID tags 306a-n to be detected and/or interrogated when flowing through a pipe.

Referring now to FIG. 4, assume that inlet pipe 212 has two components: a first section 402 and a second section 404. The first section 402 has the same original cross-sectional radius as inlet pipe 212. However, the second section 404 has been tapered down to a smaller cross-sectional radius, thus making the RFID interrogator 208a physically closer to all RFID tags laced in the input bulk material 202. While not shown, a similar arrangement can likewise be provided for tapering an exit pipe for facility output 206 (in FIG. 2) leaving the facility 204.

Another solution to detecting all RFID tags 306a-n is presented by grid 406 and RFID evaluator 408. Grid 406 is a (rigid, semi-rigid or flexible) grid that is mounted within inlet pipe 212 in a traverse manner (i.e., where the face of the grid 406 is perpendicular to the flow of the input bulk material 202). The grid 406 is preferably made of material that is both impervious (non-reactive, non-corrosive, etc.) to the input bulk material 202, and also poses no electrical interference (including RF shielding) to the RFID tags 306a-n. Mounted on the grid 406 are multiple RFID sensors 502a-n (shown in FIG. 5, where "n" is an integer), which are coupled via a sealed coupler 504 (that permits power and data communication to flow between the RFID sensors 502a-n and a RFID evaluator 408 without allowing the input bulk material 202 to escape the inlet pipe 212). The RFID evaluator 408 is substantially similar to the architecture shown in FIG. 1 for computer 102, except that the RFID sensors 502a-n (analogous to RFID sensor 126 shown in FIG. 1) are external to the computer 102.

Figure 6:
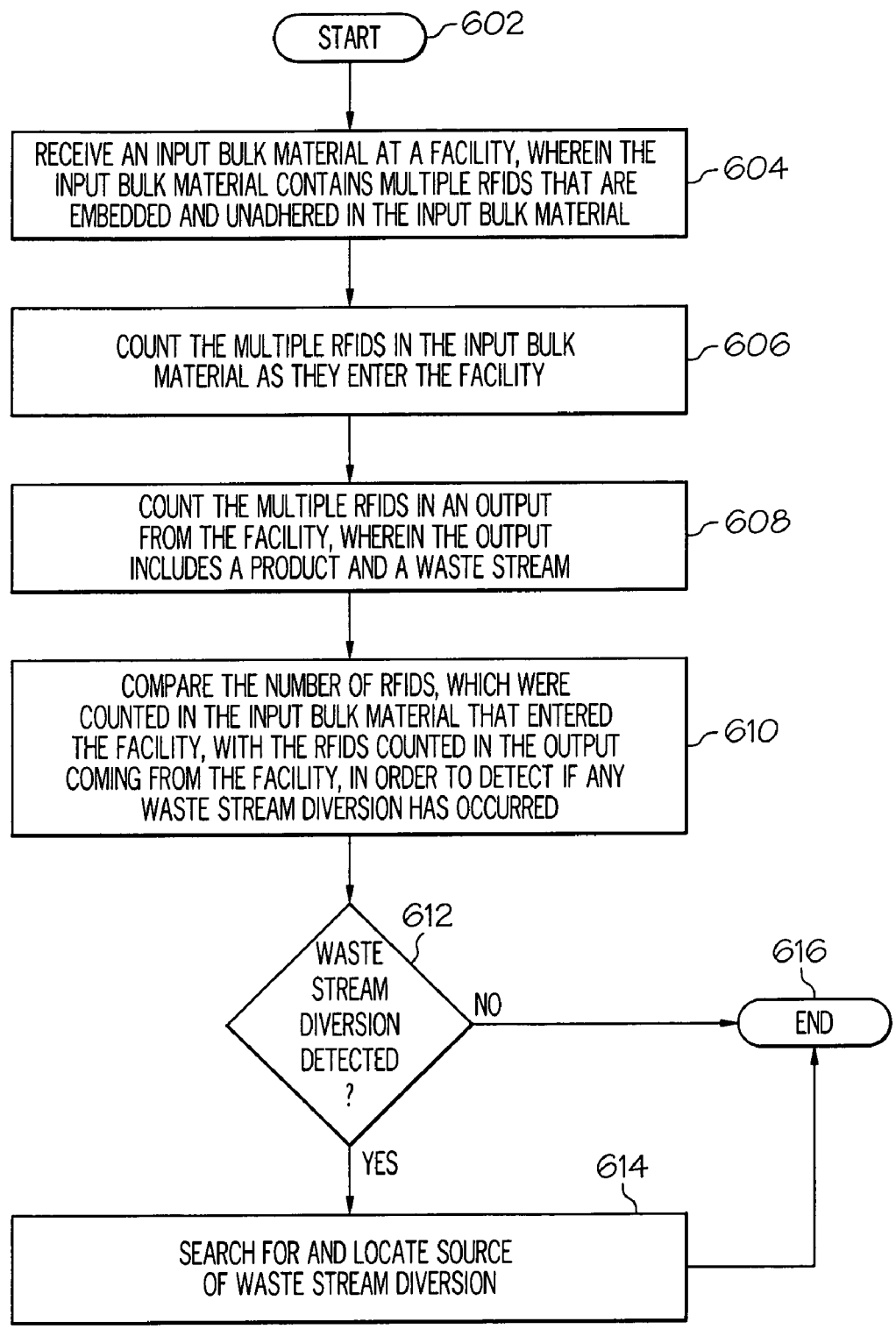
FIG. 6 is a high-level flow-chart of exemplary steps taken to detect an unplanned waste stream diversion by tracking RFID sensors that lace bulk material.

With reference now to FIG. 6, a high-level flow-chart of exemplary steps taken to detect an unplanned waste stream diversion is presented. After initiator block 602, an input bulk material, which is laced with multiple RFID tags, flows into a facility (block 604). Again, note that these multiple RFID tags are embedded with, but not adhered to, the input bulk material, which may be a liquid, a solution, a colloid, particulates, or any other free-flowing material. As the input bulk material enters the facility, the embedded RFIDs are counted (block 606). A facility output is later monitored to track the embedded RFIDs as they leave the facility (block 608). If the input count and output count do not match (blocks 610 and 612), then an assumption is made that there has been some type of untoward diversion (e.g., a waste stream diversion) of the input bulk material, which is then searched for and located (block 614). This search may be performed by portable RFID interrogator, or other RFID interrogators that are permanently mounted throughout the facility may be activated to "look for" the stray RFID tags that entered with the input bulk material. The process thus ends at terminator block 616.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention. For example, while the present description has been directed to a preferred embodiment in which custom software applications are developed, the invention disclosed herein is equally applicable to the development and modification of application software. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method of detecting an unplanned waste stream diversion at a facility, the method comprising:
   receiving an input bulk material at a facility, wherein the input bulk material comprises multiple input Radio Frequency Identification (RFID) tags that are suspended, in a colloidal state, in the input bulk material;

generating an input count by counting the multiple input RFID tags with an RFID input sensor, as the input bulk material enters the facility;

generating an output count by counting multiple output RFID tags with an RFID output sensor, wherein the multiple output RFID tags are part of a facility output that exits the facility, and wherein all of the multiple output RFID tags are from the multiple input RFID tags that entered the facility;

comparing the input count with the output count; and in response to the output count being less than the input count, determining that at least some of the multiple input RFID tags are components of an unplanned waste stream diversion at the facility.

2. The method of claim 1, wherein the unplanned waste stream diversion is a stream of hazardous materials.

3. The method of claim 1, wherein the facility output comprises a planned waste product that is generated by operating the facility.

4. The method of claim 1, wherein the facility output comprises a finished product that is produced by the facility.

5. The method of claim 1, wherein the input bulk material is a liquid lubricant used by equipment within the facility, and wherein the facility output is a planned recovery of the liquid lubricant from the equipment.

6. The method of claim 1, wherein the input RFID sensor is coupled to a grid inside an inlet line that transports the input bulk material to the facility.

7. The method of claim 1, wherein the input RFID tags are detected by positioning the RFID sensor adjacent to an inlet line that transports the input bulk material to the facility.

8. The method of claim 7, wherein the input RFID tags have a limited detection range that is less than a cross-sectional radius of a first section of the inlet line, and wherein a second section of the inlet line has a smaller cross-sectional radius in order to permit detection of the input RFID tags by positioning the RFID sensor proximate to an exterior surface of the second section of the inlet line.

9. The method of claim 1, further comprising:

in response to determining that the unplanned waste stream diversion has occurred, locating a source of the unplanned waste stream diversion by searching for the input RFID tags with an RFID interrogator that comprises a portable RFID sensor.

10. A method of enabling a detection of an unplanned waste stream diversion from a facility, the method comprising:

adding multiple input Radio Frequency Identification (RFID) tags to an input bulk material, wherein the multiple input RFID tags are suspended unadhered to the input bulk material in a colloidal state;

transporting the input bulk material with the multiple input RFID tags to the facility, wherein the multiple input RFID tags enable a tracking of the input bulk material through the facility in order to detect any unplanned diversion of the input bulk material in the facility;

generating an input count by counting the multiple input RFID tags with an RFID input sensor, as the input bulk material enters the facility;

generating an output count by counting multiple output RFID tags with an RFID output sensor, wherein the multiple output RFID tags are part of a facility output that exits the facility, and wherein all of the multiple output RFID tags are from the multiple input RFID tags that entered the facility;

comparing the input count with the output count; and in response to the output count being less than the input count, determining that at least some of the multiple input RFID tags are components of an unplanned waste stream diversion at the facility.

11. The method of claim 10, wherein the input bulk material is a dry feed stock that is used by the facility to manufacture plastic.

12. The method of claim 10, wherein the input bulk material is a liquid petroleum-based feed stock that is refined in the facility to create a refined petroleum product.

13. A system comprising:

a processor;

a memory coupled to the processor; and a Radio Frequency Identification (RFID) sensor coupled to processor, wherein the RFID sensor is enabled to detect multiple input RFID tags that are suspended unadhered to an input bulk material received by a facility;

wherein the processor and the RFID sensor are enabled to generate an input count by counting the multiple input RFID tags in the input bulk material that enters the facility;

wherein the processor and the RFID sensor are enabled to generate an output count by counting multiple output RFID tags in a facility output that exits the facility, wherein all of the multiple output RFID tags are from the multiple input RFID tags that entered the facility;

wherein the processor and memory are enabled to compare the input count with the output count; and wherein the processor is enabled, in response to the output count being less than the input count, to generate a signal indicating that at least some of the multiple input RFID tags are components of an unplanned waste stream diversion at the facility.

14. The system of claim 13, wherein the unplanned waste stream diversion is a stream of hazardous materials.

15. The system of claim 13, wherein the facility output comprises a planned waste product that is generated by operating the facility.

16. The system of claim 13, wherein the facility output comprises a finished product that is produced by the facility.

17. The system of claim 13, wherein the input bulk material is a liquid coolant used to cool a nuclear reactor by passing through the nuclear reactor, and wherein the facility output is the liquid coolant that has passed through the nuclear reactor.

18. The system of claim 13, wherein the RFID sensors are coupled to a grid within an inlet line to the facility.

19. The system of claim 13, wherein system is substantially adjacent to an inlet line to the facility.

20. The system of claim 19, wherein the input RFID tags have a limited detection range that is less than a cross-sectional radius of a first section of the inlet line, and wherein a second section of the inlet line is narrowed to permit detection of the input RFID tags by positioning the RFID sensor proximate to an exterior surface of the second section of the inlet line.

* * * * *